United States Patent
Kondo et al.

(10) Patent No.: US 8,929,722 B2
(45) Date of Patent: Jan. 6, 2015

(54) RECORDING/REPRODUCING DEVICE

(75) Inventors: Satoshi Kondo, Kyoto (JP); Akira Muto, Osaka (JP)

(73) Assignee: Panasonic Corporation, Osaka (JP)

( * ) Notice: Subject to any disclaimer, the term of this patent is extended or adjusted under 35 U.S.C. 154(b) by 2107 days.

(21) Appl. No.: 11/663,178

(22) PCT Filed: Sep. 2, 2005

(86) PCT No.: PCT/JP2005/016103
§ 371 (c)(1),
(2), (4) Date: Mar. 19, 2007

(87) PCT Pub. No.: WO2006/033224
PCT Pub. Date: Mar. 30, 2006

(65) Prior Publication Data
US 2008/0025690 A1 Jan. 31, 2008

(30) Foreign Application Priority Data
Sep. 22, 2004 (JP) .................. 2004-274806

(51) Int. Cl.
| | | |
|---|---|---|
| H04N 5/76 | (2006.01) |
| G11B 27/34 | (2006.01) |
| G11B 20/10 | (2006.01) |
| G11B 27/32 | (2006.01) |
| H04N 5/765 | (2006.01) |
| H04N 5/85 | (2006.01) |

(52) U.S. Cl.
CPC ............. *G11B 27/34* (2013.01); *G11B 20/10* (2013.01); *G11B 27/32* (2013.01); *H04N 5/765* (2013.01); *G11B 2020/10833* (2013.01); *H04N 5/85* (2013.01)
USPC ........................................ 386/292

(58) Field of Classification Search
CPC ..... H04N 5/76; H04N 7/163; H04N 7/17336; H04N 7/26276; G11B 20/00086; G11B 20/0071; G11B 20/1201; G11B 20/00688; G11B 20/00166; G11B 20/00746; G11B 20/00768; G11B 20/00094; G11B 7/0037
USPC ......... 386/279, 286, 291, 292, 293, 294, 295, 386/296
See application file for complete search history.

(56) References Cited

U.S. PATENT DOCUMENTS

| | | |
|---|---|---|
| 6,606,449 B1 | 8/2003 | Ishikawa |
| 2002/0041554 A1* | 4/2002 | Kitamura et al. .......... 369/53.37 |

(Continued)

FOREIGN PATENT DOCUMENTS

| | | |
|---|---|---|
| JP | 9-149361 | 6/1997 |
| JP | 2000-175150 | 6/2000 |

(Continued)

OTHER PUBLICATIONS

User Manual of Sony DVD recorder RDR-HX10 and RDR-HX8, pp. 67-71, 2003.

(Continued)

*Primary Examiner* — Tat Chio
(74) *Attorney, Agent, or Firm* — Wenderoth, Lind & Ponack, L.L.P.

(57) ABSTRACT

A recording and reproducing device reproduces content management information from a recording medium and inputs the content management information to a control unit via a recording and reproducing processing unit. An image generation unit generates a menu screen using content information in the management information extracted by the control unit, and outputs the menu screen via a display processing unit. When content is to be dubbed by a user, the content dubbing destination and the preset time to dub the content are entered to the control unit via an operation unit, and these entries are held in a schedule management unit.

16 Claims, 13 Drawing Sheets

(56) References Cited

U.S. PATENT DOCUMENTS

| | | | |
|---|---|---|---|
| 2002/0126986 A1* | 9/2002 | Lim et al. | 386/52 |
| 2002/0191954 A1* | 12/2002 | Beach et al. | 386/46 |
| 2003/0077064 A1* | 4/2003 | Katayama | 386/46 |
| 2003/0091342 A1* | 5/2003 | Shibutani et al. | 386/131 |
| 2004/0252966 A1* | 12/2004 | Holloway et al. | 386/46 |
| 2004/0258396 A1* | 12/2004 | Nakamura et al. | 386/83 |
| 2005/0019011 A1 | 1/2005 | Takeda | |
| 2005/0025468 A1* | 2/2005 | Osaki | 386/125 |
| 2005/0036427 A1* | 2/2005 | Suh | 369/94 |
| 2006/0080496 A1 | 4/2006 | Miyake et al. | |
| 2006/0280107 A1* | 12/2006 | Suh | 369/275.1 |

FOREIGN PATENT DOCUMENTS

| | | |
|---|---|---|
| JP | 2001-319410 | 11/2001 |
| JP | 2002-185926 | 6/2002 |
| JP | 2004-040335 | 2/2004 |
| JP | 2004-40335 | 2/2004 |
| JP | 2004-199789 | 7/2004 |
| JP | 2005-44423 | 2/2005 |
| JP | 2005-109742 | 4/2005 |
| JP | 2005-167297 | 6/2005 |
| WO | 2004/055812 | 7/2004 |

OTHER PUBLICATIONS

Partial English translation of JP 2002-185926, which was cited in the IDS filed Mar. 19, 2007.

* cited by examiner

FIG. 3A

| Recorded date | Title | Time | Recording mode |
|---|---|---|---|
| Sept. 15 | Baseball: Kyoshin vs. Hanjin | 2h | Standard |
| Sept. 14 | Drama: Shinsengumi | 1h | Standard |
| Sept. 12 | Fountain of Olivia | 1h | Long time |
| Sept. 11 | 3-minute Cooking | 5min | Standard |
| Sept. 10 | Broadcast Station Special | 45min | High quality |

FIG. 3B

Dubbing destination: Recording medium A   (Recording medium B)

Preset time: ☐ Month  ☐ Day  ☐ Hour  ☐ Minute

FIG. 3C

Dubbing destination: Recording medium A   (Recording medium B)

Preset time: Manual  ☐ Month  ☐ Day  ☐ Hour  ☐ Minute
(Automatic)

FIG. 5

| Number | Speed |
|--------|-------|
| 0 | 1x |
| 1 | 2x |
| 2 | 4x |
| 3 | 6x |
| 4 | 8x |
| 5 | 12x |
| 6 | 16x |

Since recording medium B is not inserted, you cannot set timer dubbing.

Since recording medium B is not inserted, please insert it by dubbing start time.

FIG. 11

| Recorded date | Title | Time | Recording mode |
|---|---|---|---|
| Sept. 15 | Baseball: Kyoshin vs. Hanjin | 2h | Standard |
| Sept. 14 | Drama: Shinsengumi | 1h | Standard |
| Sept. 12 | Fountain of Olivia | 1h | Long time |
| Sept. 11 | 3-minute Cooking | 5min | Standard |
| Sept. 10 | Broadcast Station Special | 45min | High quality |

Delete partially    Delete completely

RECORDING/REPRODUCING DEVICE

BACKGROUND OF THE INVENTION

1. Technical Field

The present invention relates to a recording and reproducing device having a function of dubbing audio/video data or the like recorded on a recording medium onto another recording medium.

2. Background Art

In recent years, video recorders having plural recording and reproducing means have started to become widespread. A typical example of such a video recorder is a video recorder including both a hard disk (HDD) and a recording DVD. This type of device can be used in such a manner that TV programs are recorded on an HDD and viewed first, and then a program that a user wants to preserve is dubbed onto a DVD (see, for example, Non-patent Reference 1).

Non-patent Reference 1: User manual of Sony DVD recorder RDR-HX10 and RDR-HX8, pp. 67 to 71 (2003)

However, the above-mentioned conventional video recorder does not allow a user to do any other processing in the middle of dubbing the program recorded on the HDD onto the DVD. Assuming, for example, the case where the time has come to start recording a preset program after the dubbing starts, the conventional video recorder has a problem that it does not allow a user to record, during the dubbing, the program being currently broadcasted. Furthermore, even in the case where a timer is set so that dubbing is started during an available time period when recording of any program is not set, the conventional video recorder cannot accurately calculate the amount of time required for the dubbing, and therefore, if the dubbing takes more time than expected, it has a problem that it hinders the start of recording a program which has been set immediately after the end of the dubbing.

The present invention has been conceived to solve the above-mentioned conventional problems, and has an object to provide a recording and reproducing device capable of performing reliable dubbing without hindering recording processing or the like of a program being currently broadcasted.

SUMMARY OF THE INVENTION

In order to solve these problems, the recording and reproducing device of the present invention is a recording and reproducing device that records and reproduces audio/video content, and includes: a first recording and reproducing processing unit which records and reproduces audio/video content on and from a first recording medium; a second recording and reproducing processing unit which records and reproduces audio/video content on and from a second recording medium; an operation accepting unit which accepts an instruction regarding either recording or reproduction of audio/video content from a user; and a control unit which calculates an amount of time required for dubbing in accordance with the second recording medium, when receiving, from the operation accepting unit, a dubbing instruction to execute, at a preset time, dubbing of audio/video content from the first recording medium onto the second recording medium using the first recording and reproducing processing unit and the second recording and reproducing processing unit.

As described above, the recording and reproducing device of the present invention calculates an amount of time required for performing dubbing processing in accordance with the second recording medium, when it dubs the audio/video content recorded on the first recording medium onto the second recording medium. Therefore, it is possible to accurately calculate the recording speed of the second recording medium and thus calculate more accurate dubbing time. By this processing, it is possible to perform dubbing processing smoothly using an available time period and to do dubbing without hindering recording processing or the like of a program being currently broadcasted. Therefore, the present invention has a high practical value.

BRIEF DESCRIPTION OF DRAWINGS

FIG. 3 is a schematic diagram for explaining the details of processing for setting timer dubbing in the recording and reproducing device of the present invention (First Embodiment).

FIG. 5 is a diagram which shows one example of a table in which the recording speeds of the recording medium are represented by numbers (First Embodiment).

FIG. 11 is a diagram which shows one example of a screen displayed for prompting a user to delete partially or completely the content recorded on the recording medium B when timer dubbing is set in the recording and reproducing device of the present invention (First Embodiment).

NUMERICAL REFERENCES

Figure 1:
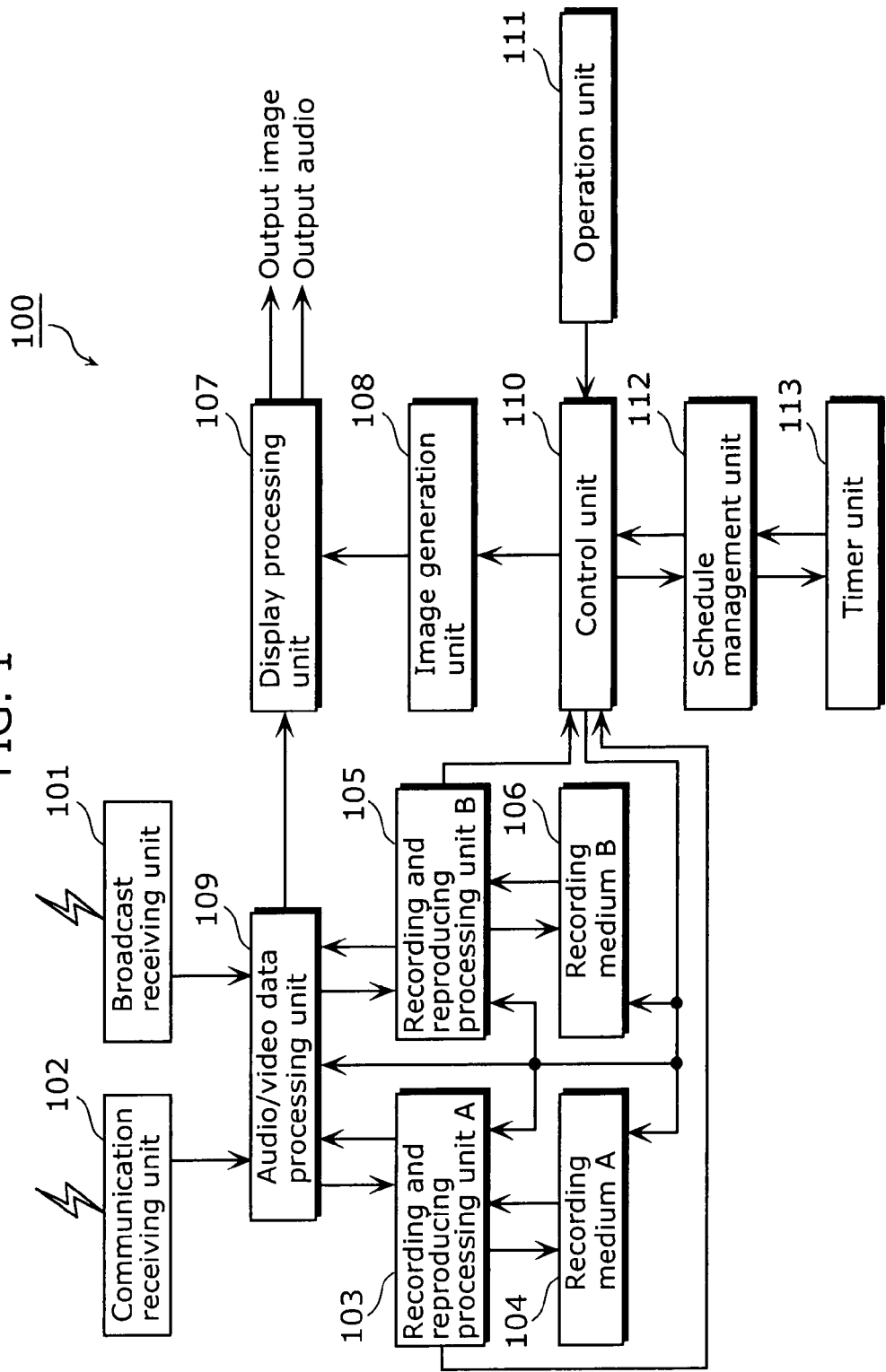
FIG. 1 is a block diagram which shows a structure of a recording and reproducing device of the present invention (First Embodiment).

101 Broadcast receiving unit
102 Communication receiving unit
103, 105 Recording and reproducing processing units
104, 106 Recording media
107 Display processing unit 108 Image generation unit
109 Audio/video data processing unit
110 Control unit
111 Operation unit
112 Schedule management unit
113 Timer unit

DETAILED DESCRIPTION OF THE INVENTION

The embodiment of the present invention will be described below with reference to FIG. 1 to FIG. 13.

First Embodiment

FIG. 1 is a block diagram of a recording and reproducing device 100 which is one structural example of the recording and reproducing device of the present invention. The recording and reproducing device 100 is a recording and reproducing device having functions of calculating an amount of time required for dubbing audio/video content specified by a user from a first recording medium onto a second recording medium, and of controlling dubbing processing depending on whether the calculated amount of time overlaps with the previously scheduled time of another operation (for example, timer recording). The recording and reproducing device 100 includes a broadcast receiving unit 101, a communication receiving unit 102, a recording and reproducing processing unit A 103 which is a first recording and reproducing processing unit, a recording medium A 104 which is a first recording medium, a recording and reproducing processing unit B 105 which is a second recording and reproducing processing unit, a recording medium B 106 which is a second recording medium, a display processing unit 107, an image generation unit 108, an audio/video data processing unit 109, a control unit 110, an operation unit 111, a schedule management unit 112, and a timer unit 113.

[Processing at the Time of Recording]

The recording and reproducing device 100 has two types of recording media (i.e., the recording medium A 104 and the recording medium B 106), and is capable of performing recording and reproducing on and from these recording media. Such recording media are, for example, a magnetic disk such as an HDD or the like, an optical disk such as a DVD or the like, a memory card such as an SD memory or the like, a magnetic tape such as a VHS, D-VHS or the like, and so forth.

Broadcast data and communication data are inputted to the broadcast receiving unit 101 and the communication receiving unit 102 from outside. For example, analog broadcast waves and digital broadcast waves are inputted to the broadcast receiving unit 101. Communication waves are inputted to the communication receiving unit 102 via the Internet and wireless networks. It is assumed that these broadcast waves and communication waves include audio/video content data, their auxiliary content data and the like. The broadcast waves and communication waves inputted to the broadcast receiving unit 101 and the communication receiving unit 102 are subjected to demodulation processing and the like respectively by these receiving units, and then inputted to the audio/video data processing unit 109.

The audio/video data processing unit 109 performs processing on the audio/video data inputted from the broadcast receiving unit 101 and the communication receiving unit 102. It is assumed that the audio/video data processing unit 109 performs processing for converting the data into a data format suitable for recording it onto a recording medium. For example, in the case where data is recorded onto a recording medium in the format of a MPEG-2 transport stream, if audio/video data inputted to the audio/video data processing unit 109 is an analog signal (for example, when the broadcast receiving unit 101 receives an analog broadcast wave), the audio/video data processing unit 109 performs A/D conversion on the audio/video data, encodes the video data and the audio data respectively in accordance with MPEG-2 scheme or the like, and then, multiplexes the encoded audio and video data into the transport stream and outputs the resulting stream. If the audio/video data inputted to the audio/video data processing unit 109 is an MPEG-2 transport stream of a digital signal (for example, when the broadcast receiving unit 101 receives a digital broadcast wave), the audio/video data processing unit 109 outputs it as it is without performing any processing. In general, the format of audio/video data suitable for recording varies from one recording medium to another. There are various data structures, as data formats for recording onto recording media, such as an MPEG-2 transport stream, an MPEG-2 program stream, an MP4 format, a unique format, and the like. It is assumed here that the format for recording audio/video data onto the recording medium A is an MPEG-2 transport stream and the audio/video data is recorded onto the recording medium A.

The audio/video data processed in the audio/video data processing unit 109 is inputted to the recording and reproducing processing unit A 103 or the recording and reproducing processing unit B 105 in accordance with the desired recording medium. Specifically, the audio/video data is inputted to the recording and reproducing processing unit A 103 when the recording medium A 104 is desired, while it is inputted to the recording and reproducing processing unit B 105 when the recording medium B 106 is desired. The control unit 110 controls to which unit the data is to be inputted. The recording and reproducing processing unit A 103 and the recording and reproducing processing unit B 105 perform signal processing and the like, as a preparation for recording, on the inputted audio/video data, so as to record the data onto the recording medium (the recording medium A 104 or the recording medium B 106). Since it is assumed here that the audio/video data is recorded onto the recording medium A, the audio/video data is recorded onto the recording medium A 104 via the recording and reproducing processing unit A 103.

[Processing at the Time of Reproducing]

When the audio/video data recorded on the recording medium A 104 is reproduced, a signal reproduced from the recording medium A 104 is inputted to the recording and reproducing processing unit A 103. After the signal is subjected to the signal processing and the like in the recording and reproducing processing unit A 103, it is inputted to the audio/video data processing unit 109 as an MPEG-2 transport stream.

The audio/video data processing unit 109 performs processing on the inputted data for the output of the data (video display and audio reproduction). Since the MPEG-2 transport stream is inputted here, the audio/video data processing unit 109 extracts a video elementary stream and an audio elementary stream from the transport stream, and performs decoding processing on these elementary streams respectively. The generated video signal and audio signal are inputted to the display processing unit 107 in this manner, and then outputted to an external device (such as a television, a PC monitor or the like for the video signal, and a speaker or the like for the audio signal, which are not shown in the diagrams) from the display processing unit 107. It is assumed here that if the format of the audio/video data is a format other than the MPEG-2 transport stream, the audio/video data processing unit 109 performs the processing suitable for that format.

[Processing at the Time of Dubbing]

A description is given as to the processing for dubbing the data recorded on the recording medium A 104 onto the recording medium B 106.

A signal reproduced from the recording medium A 104 is inputted to the recording and reproducing processing unit A 103. After the signal is subjected to the signal processing and the like in the recording and reproducing processing unit A 103, it is inputted to the audio/video data processing unit 109 as an MPEG-2 transport stream.

The audio/video data processing unit 109 converts the inputted data into a structure suitable for recording onto the recording medium B 106. It is assumed here that the data is recorded onto the recording medium B 106 in a form of an MPEG-2 program stream. In this case, the audio/video data processing unit 109 converts the MPEG-2 transport stream into the MPEG-2 program stream and outputs it. The outputted data is inputted to the recording and reproducing processing unit B 105. The recording and reproducing processing unit B 105 performs signal processing and the like, as a preparation for recording, on the inputted audio/video data, so as to record the data onto the recording medium B 106.

However, if the recording format of the recording medium A is the same as that of the recording medium B, the audio/video data processing unit 109 outputs the inputted audio/video data as it is without performing any processing on the data.

Not only when the system stream format is changed as mentioned in the above example, but also when the elementary stream format is changed (for example, from the MPEG-2 format to the MPEG-4 format), or the bit rate or the image size is changed, such conversion processing is performed at the elementary stream level.

Furthermore, when the dubbing mode is "move" (when a user explicitly specifies "move" mode or only "move" mode is possible for controlling copying of content), content recorded on a dubbing source recording medium needs only be deleted after the dubbing.

[Processing at the Time of Setting Timer Dubbing]

Figure 2:
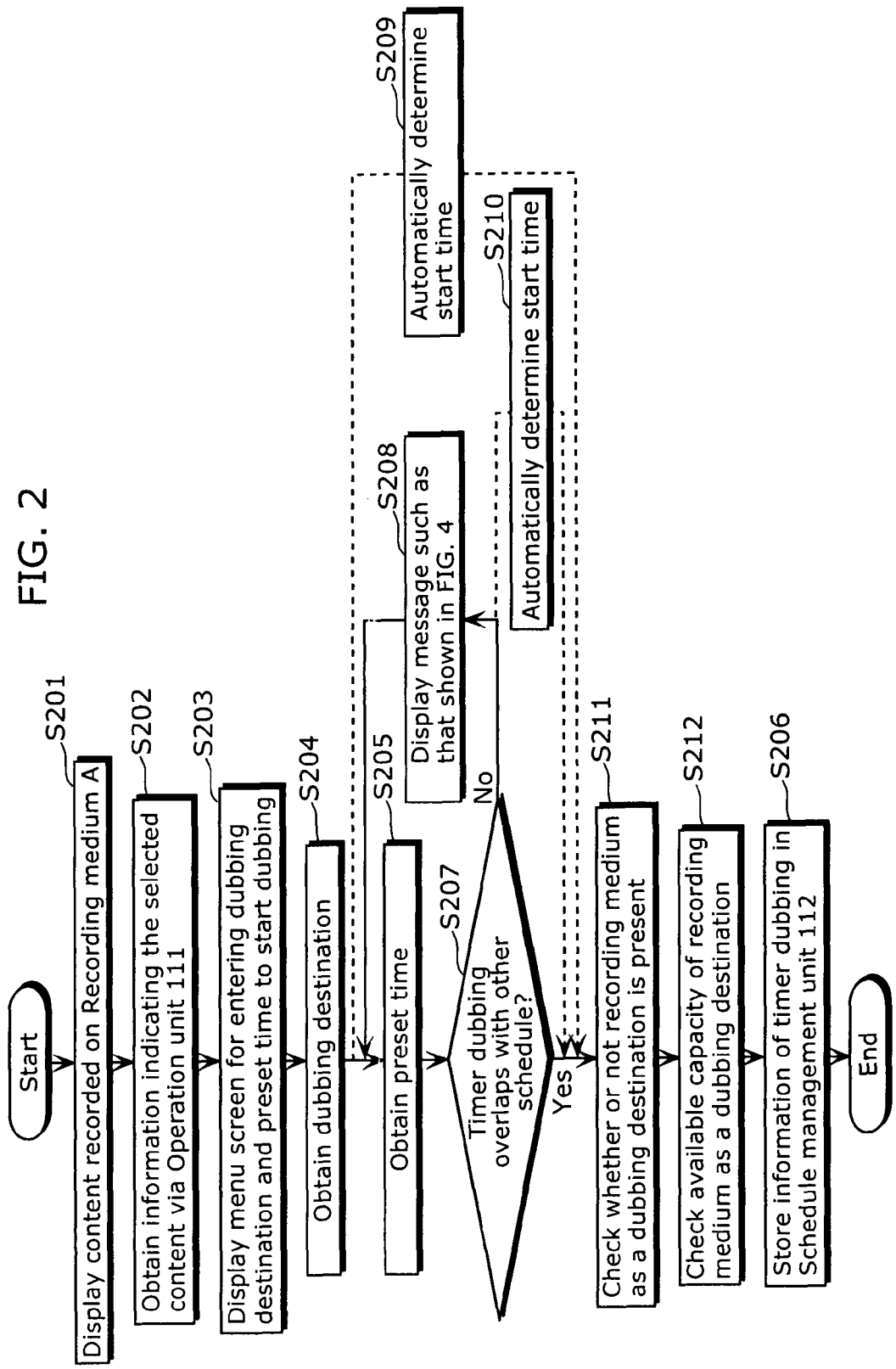
FIG. 2 is a flowchart for explaining the details of processing for setting timer dubbing in the recording and reproducing device of the present invention (First Embodiment).

A description is given as to the processing method for setting the time for executing dubbing in the recording and reproducing device 100. It is assumed here that dubbing includes not only "copying" (duplication) of audio/video data but also "moving" thereof. FIG. 2 is a flowchart which shows the processing procedure for accepting an operation to set timer dubbing from a user.

Since a menu screen is displayed when the recording and reproducing device 100 accepts the operation to set timer dubbing from a user, the user performs the processing for setting the dubbing on the menu screen. The menu screen is generated by the image generation unit 108 under the control of the control unit 110, and outputted to an external display device (such as a television, a PC monitor or the like not shown in the diagrams) via the display processing unit 107.

One example of the menu screen is shown in FIG. 3A. FIG. 3A is an example display indicating information of content (TV programs) recorded on the recording medium A 104. It is assumed that the information of the content is recorded, as management information, on the recording medium A 104. This management information is reproduced from the recording medium A 104 and inputted to the control unit 110 via the recording and reproducing processing unit A 103. The control unit 110 extracts the information of the content from the management information, and instructs the image generation unit 108 to generate a menu screen. The image generation unit 108 generates the menu screen as shown in FIG. 3A, and outputs it via the display processing unit 107 (S201). The information, such as the title, recorded date (recorded date and time), recording time, recording mode and the like, is displayed for each of the content, and the user selects the content that he/she wants to dub from among the displayed content. This selection is made via the operation unit 111. This operation unit 111 is a button on a device, a keyboard, a PC connected by a cable or a network, or the like. It can be connected either with or without wires. When the user selects the content via the operation unit 111, the information indicating the content selected by the user is inputted to the control unit 110 via the operation unit 111 (S202). Then, the content to be dubbed is selected, the control unit 110 instructs the image generation unit 108 to generate a menu screen. The image generation unit 108 generates the menu screen as shown in FIG. 3B, and outputs it via the display processing unit 107 (S203). FIG. 3B is an example of a menu screen for entering a content dubbing destination and a preset time to start timer dubbing. Since there is no other recording medium on which content is recorded but the recording medium B 106, except the recording medium A 104, the recording medium B 106 is designated as the dubbing destination. The information indicating the recording medium selected by the user is inputted to the control unit 110 via the operation unit 111 (S204). As the preset time, the time at which dubbing of the content specified as shown in FIG. 3A should be started is designated. The information indicating the preset time is inputted to the control unit 110 via the operation unit 111 (S205).

The above entries (i.e., the selected content, dubbing destination, and preset time) are inputted to the control unit 110 via the operation unit 111, and stored in the schedule management unit (S206).

Furthermore, in the case where the schedule management unit 112 has already retained timer recording of a broadcast/communication program, the control unit 110 compares between the program recording schedule and the dubbing schedule (S207). If the execution duration of the program recording overlaps with the execution duration of the dubbing, the control unit 110 gives a notification to a user by voice or with an image (S208). It is necessary to compare between the time length from the start to the end of the program recording and the time length from the start to the end of the dubbing, in order to judge whether or not these execution durations overlap one another. In general, an amount of time required for dubbing varies depending on the format into which content is converted when it is dubbed. For example, when the format conversion is not needed, the speed for recording and reproducing on and from a recording medium is a dominant factor. When the format conversion is needed, a conversion at the elementary stream level (such as a conversion between the MPEG-2 format and the MPEG-4 format, a conversion of bit rate, image size, or the like) takes more time than a conversion at the system stream level (such as a conversion from a transport stream into a program stream, or the like), and therefore takes more time to dub accordingly. Since the control unit 110 has information about how long it will take to do each type of conversion, it can estimate an amount of time required for dubbing based on the information.

Figure 4:
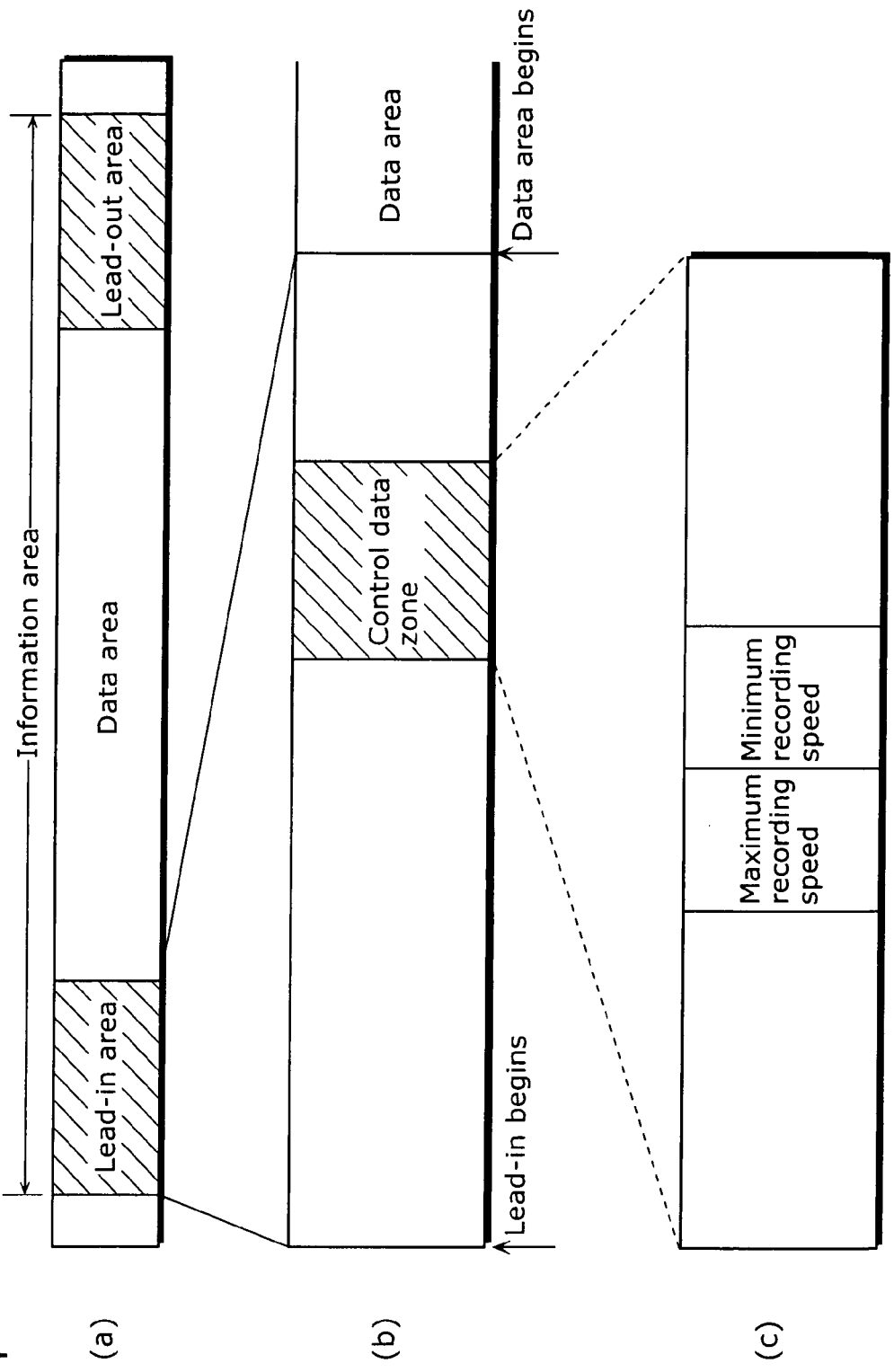
FIGS. 4 (a) (b) (c) is a diagram which shows a data structure in an information area of a recording medium (First Embodiment).
Figure 5:
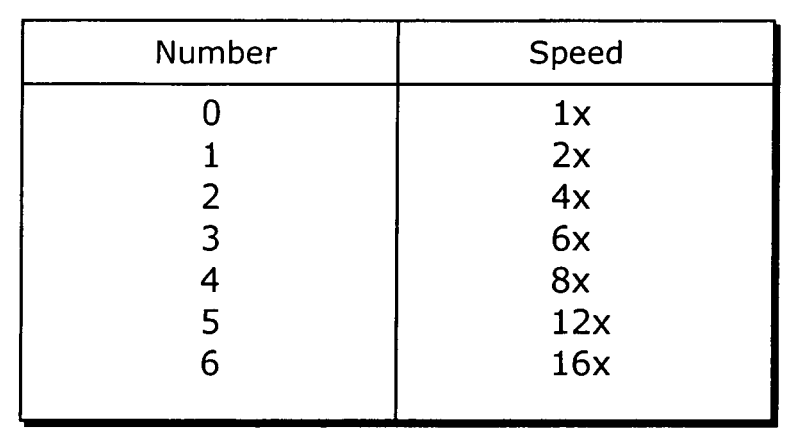
Figure 6:
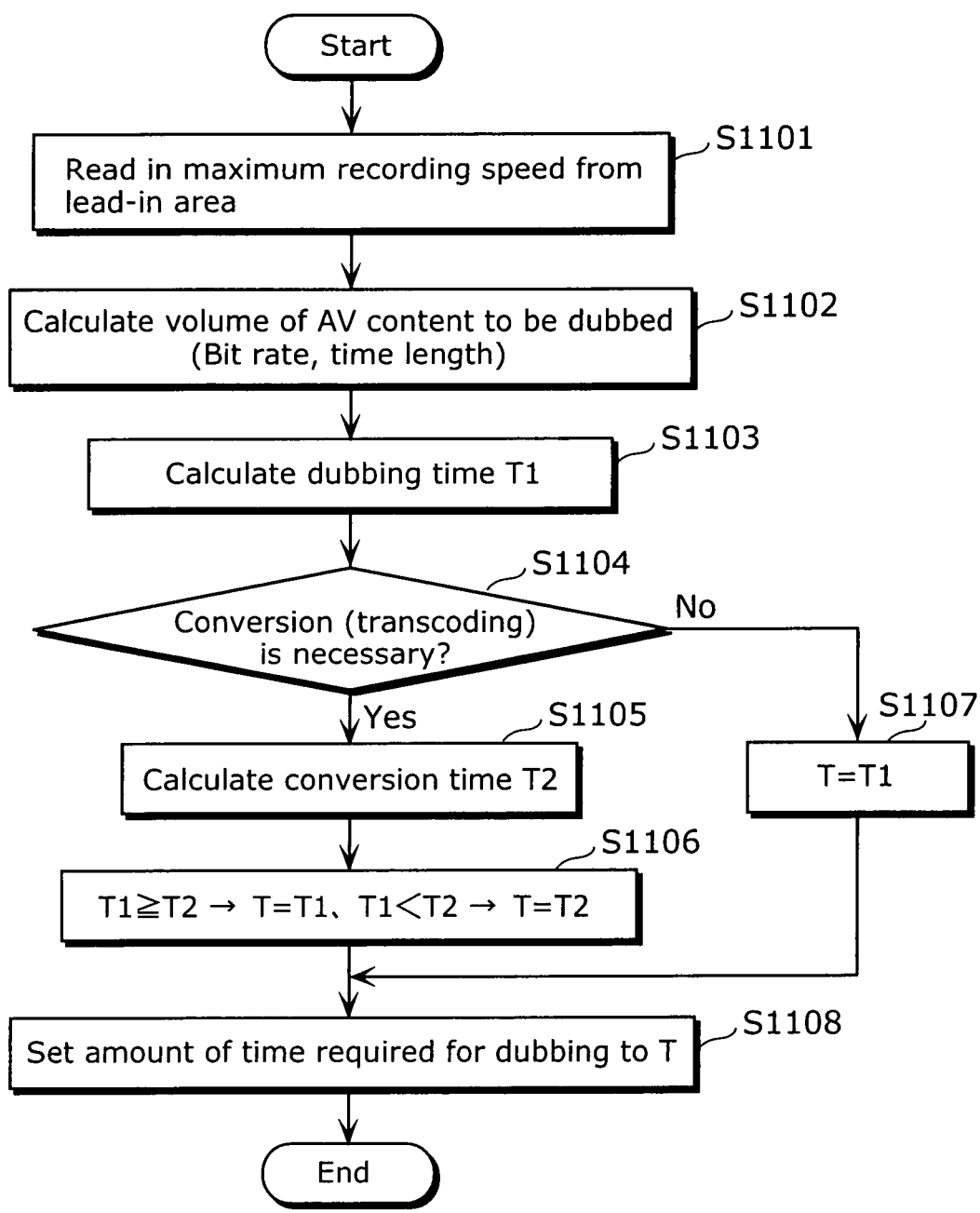
FIG. 6 is a flowchart which shows one example of a procedure by which the control unit calculates dubbing time (First Embodiment).

Furthermore, the amount of time required for dubbing is also affected by the recording speed onto a removable recording medium. More specifically, the amount of time required for dubbing varies depending on the recording speed of the recording medium B 106 inserted to the recording and reproducing processing unit B 105 or the recording speed supported by the recording and reproducing processing unit B 105. For example, in the case where timer recording is set after timer dubbing is set, the time may come to start the timer recording during the execution of the dubbing if a recording medium of 2× (double) speed is used, although the dubbing time does not overlap with the recording time if a recording medium of 4× (4-times) speed is used. Therefore, in the present embodiment, the control unit 110 first controls the recording and reproducing processing unit B 105 so as to cause the recording and reproducing processing unit B 105 to read out the maximum recording speed of the recording medium B 106 therefrom. FIGS. 4 (*a*) (*b*) (*c*) is a diagram which shows a data structure of the information area in the recording medium B 106. FIG. 5 is a diagram which shows one example of a table in which the recording speeds of the recording medium are represented by numbers. FIG. 6 is a flowchart which shows one example of the procedure by which the control unit 110 calculates dubbing time. FIG. 4 (*a*) shows a cross section of a disk, and the left end of the cross section is the rotating center of the disk. The recording and reproducing processing unit B 105 reads out control information from the lead-in area at the inner radius of the disk. As shown in FIG. 4 (*b*), a control data zone is provided in this lead-in area. As shown in FIG. 4 (*c*), the maximum recording speed and the minimum recording speed of the recording medium B 106 are recorded in this control data zone. The recording and reproducing processing unit B 105 reads out the maximum recording speed of the recording medium B 106 from this control data zone. The table of FIG. 5 is stored in the control unit 110 shown in FIG. 1. In general, the minimum recording time of a recording medium is 1× speed represented by "0" in this table. 1× speed of a DVD is 10.08 Mbps. The control unit 110 can know the maximum recording speed of the recording medium B 106 by referring to this table as well as the management information inputted from the recording and reproducing processing unit B 105 (S1101).

Furthermore, the control unit 110 calculates the volume of audio/video content to be dubbed and calculates the bit rate and the reproduction time length of the audio/video content (S1102). Next, the control unit 110 calculates the dubbing time T1 based on the maximum recording speed of the recording medium B 106 obtained in Step S1101 and the volume of the audio/video content obtained in Step S1102 (S1103). The control unit 110 judges whether or not some sort of transcoding is necessary for dubbing from the recording medium A 104 to the recording medium B 106 (S1104), and when the transcoding is not necessary, the control unit 110 determines the dubbing time T to be T1 (1107) and sets the amount of time required for dubbing to T (S1108). The control unit 110 also judges whether or not some sort of transcoding is necessary for dubbing from the recording medium A 104 to the recording medium B 106 (S1104), and when the transcoding is necessary, the control unit 110 calculates the conversion time T2 required for the transcoding (S1105). Next, when the dubbing time T1 is equal to or longer than the conversion time T2, the control unit 110 determines the amount of time required for dubbing T to be T1, while when the dubbing time T1 is shorter than the conversion time T2, it determines the amount of time required for dubbing T to be T2 (S1108). As mentioned above, by calculating the amount of time required for dubbing in consideration of the maximum recording speed of the recording medium B 106, the control unit 110 can accurately calculate the dubbing time from the recording medium A 104 to the recording medium B 106. By doing so, it is possible to prevent, with accuracy, an obstacle to setting of the next recording caused by the time it has taken longer than expected to execute the timer dubbing.

Figure 7A:
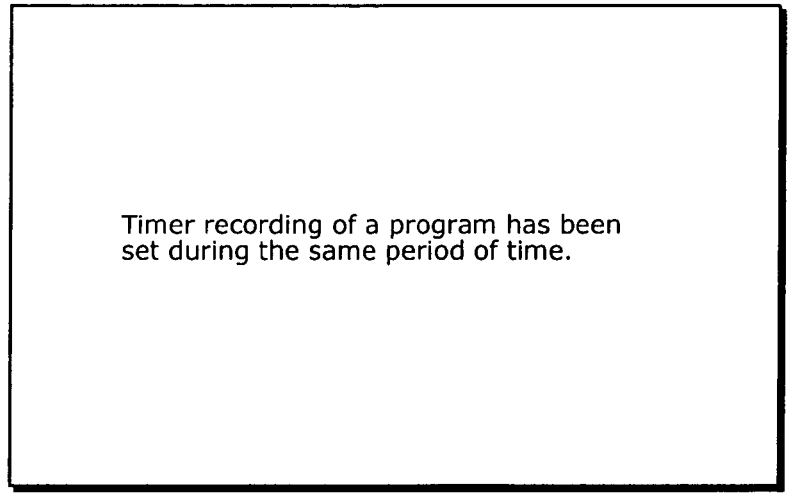
FIG. 7 is a schematic diagram for explaining the details of processing for setting timer dubbing in the recording and reproducing device of the present invention (First Embodiment).
Figure 7B:
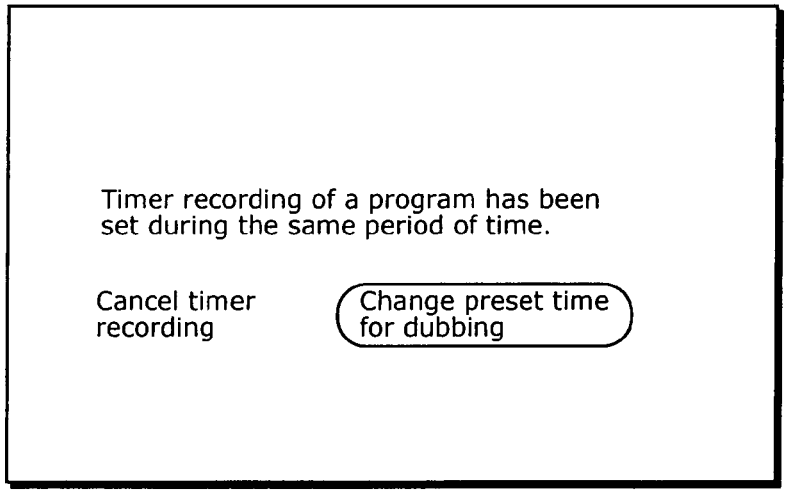
Figure 7C:
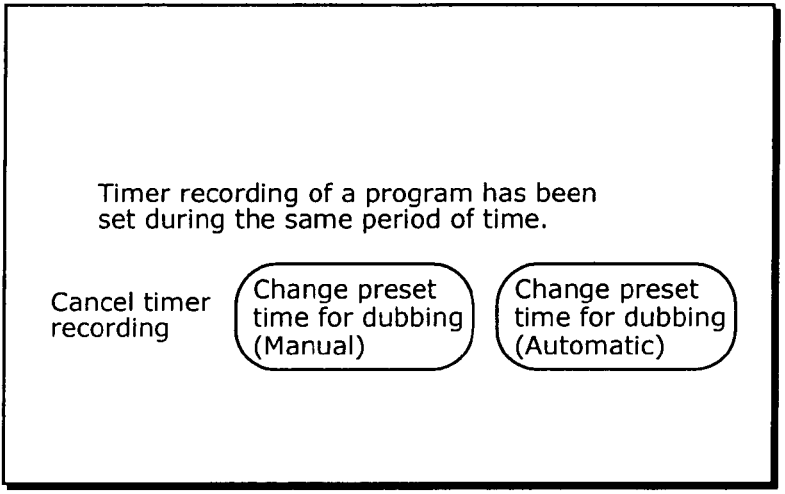

FIGS. 7A, 7B and 7C are diagrams which show the examples of images for notifying a user that the execution duration of program recording overlaps with the execution duration of dubbing. In order to present the notification to the user (S208), the image generation unit 118 can generate an image as shown in FIG. 7A and output it to an external device via the display processing unit 107. This is the processing for prioritizing timer recording of a program because the time to start recording the program cannot be changed (the time is determined according to the broadcast/communication schedule). In this case, it is also possible to allow a user to select the processing to be performed next by displaying the screen as shown in FIG. 7B or 7C as well. The candidates for the next processing are "cancel of timer recording", "change of time to start timer dubbing", and so forth. FIG. 7B shows an example of a menu screen generated by the image generation unit 108 in this case. By performing this processing, the user can specify another time. Also in the case where the device has a function of setting timer recording of not only a broadcast/communication program but also an external input (an input of audio/video content from an external device), the same processing can be performed. Furthermore, as another example of the display, in the case where the execution duration of program recording overlaps with the execution duration of dubbing, the control unit 110 may display on the menu screen (not shown in the diagrams), a message such as "Timer recording of a program has been set during the same period of time. Timer dubbing onto a currently inserted recording medium of m-times speed will be finished at the time of XX:XX:XX. Dubbing onto a recording medium of n-times speed would be finished before the program recording starts".

Or, the control unit 110 may obtain an available time period by referring to the schedule previously held in the schedule management unit 112 so as to determine the dubbing execution time. In the flowchart of FIG. 2, the sequence of processing for determining the time to start timer dubbing at the side of the recording and reproducing device 100 is shown by dashed lines. This processing may be executed by clicking the "Automatic" button on the screen as shown in FIG. 3C (S209) instead of entering the dubbing start time when a user sets timer dubbing, or may be executed in the case where the time to start timer dubbing set by the user overlaps with another preset time (S210). Using this processing, it is possible to reduce the user's burden of specifying time and make scheduling more flexible. Furthermore, in this case, the control unit 110 does not request the user to enter the explicit dubbing execution time, but may accept the user's choice of one of the options such as "execute in an available time period", and "execute in an available time period at up to the date and time of XX o'clock, XXth". Using this processing, it is possible to make dubbing scheduling more flexible.

Figure 8A:
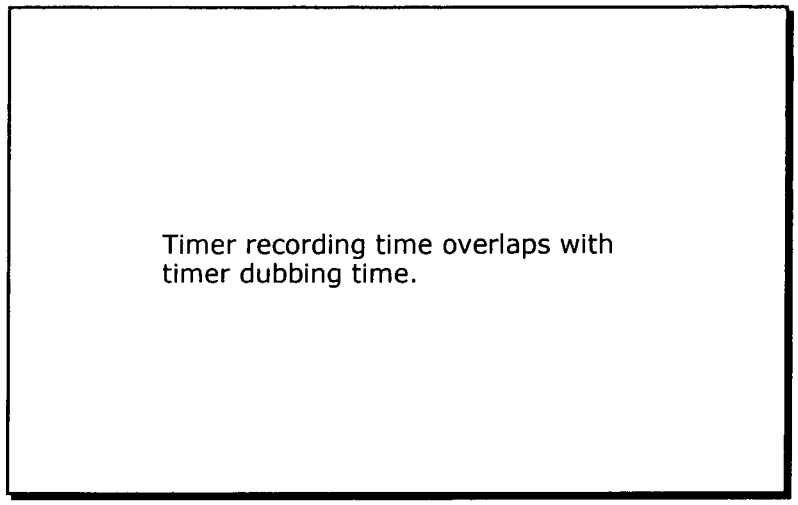
FIG. 8 is a schematic diagram for explaining the details of processing for setting timer dubbing in the recording and reproducing device of the present invention (First Embodiment).
Figure 8B:
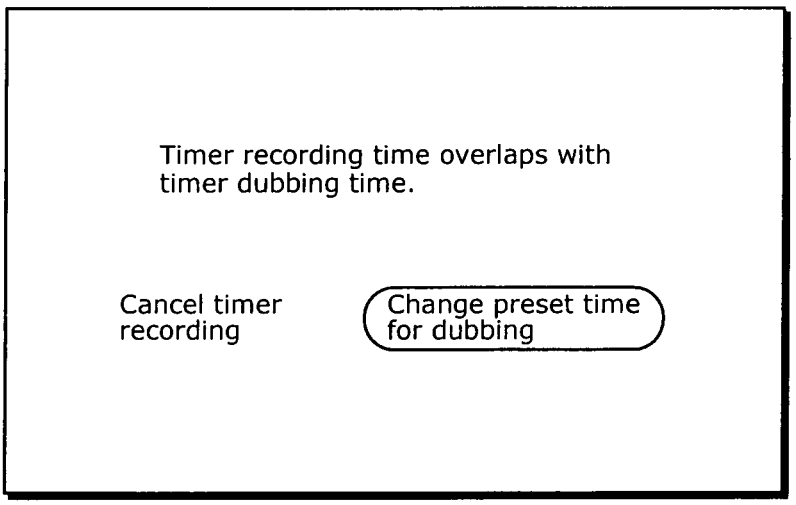

FIGS. 8A and 8B are diagrams which show examples of messages displayed in the case where timer recording of a program is entered after timer dubbing is set. Or, in the case where timer recording of a broadcast/communication is entered after timer dubbing is set and the recording execution duration overlaps with the dubbing execution duration, the control unit 110 may perform the processing for notifying the user of such situation, or notifying the user of such situation and then displaying a message for prompting the user to change the preset time for dubbing or cancel the timer dubbing (FIG. 8A and FIG. 8B).

Figure 9A:
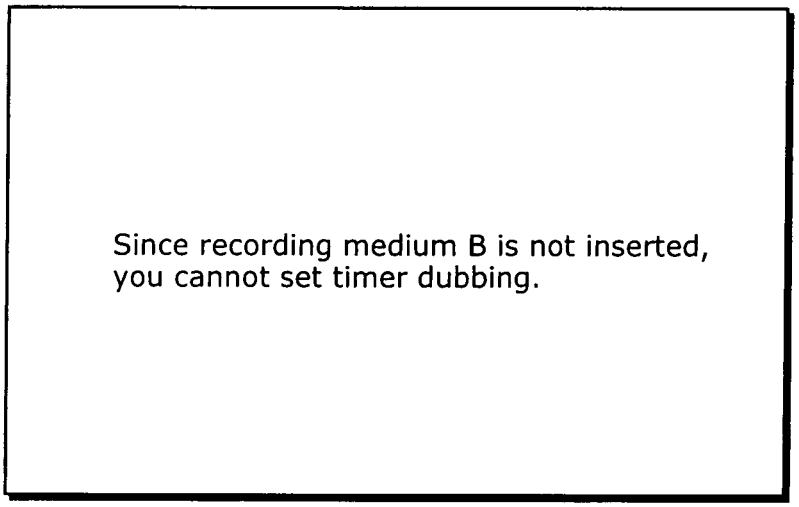
FIG. 9 is a schematic diagram for explaining the details of processing for setting timer dubbing in the recording and reproducing device of the present invention (First Embodiment).
Figure 9B:
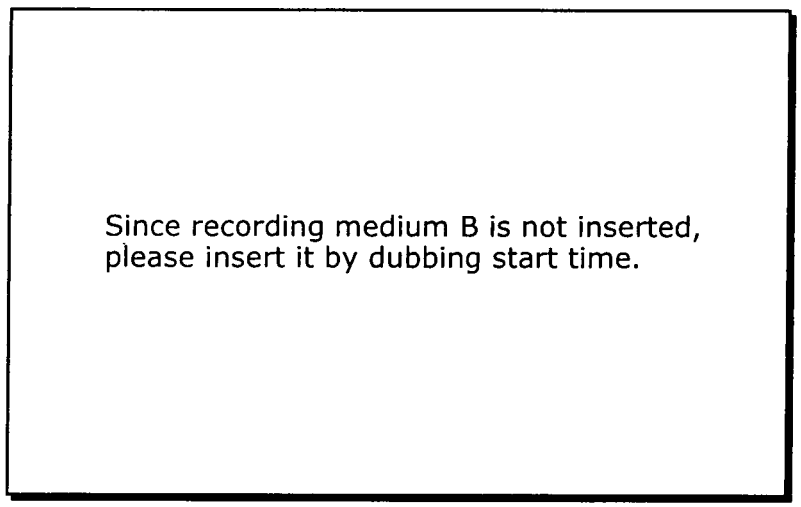

FIG. 9A and FIG. 9B are diagrams which show examples of messages for prompting a user to insert the recording medium B 106 if the recording medium B 106 is not inserted when timer dubbing is set. The control unit 110 checks whether or not a recording medium as a dubbing destination is present when timer dubbing is set (S211). When the recording medium as a dubbing destination is not present, the control unit 110 may perform the processing of notifying the user of such situation to cancel the timer dubbing (FIG. 9A), or notifying the user of such situation and displaying a message for prompting the user to insert the recording medium (FIG. 9B). Here, the control unit 110 may prompt the user to insert the recording medium immediately or to insert it by the start time for timer dubbing.

Figure 10A:
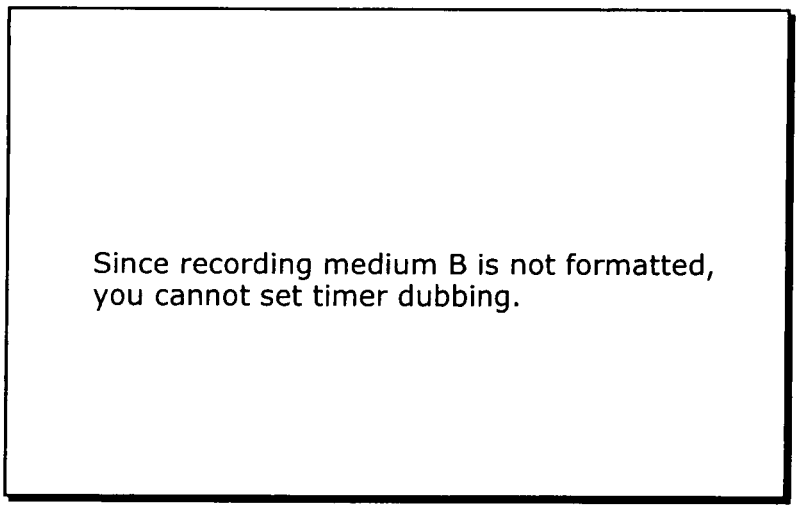
FIG. 10 is a diagram which shows one example of a screen displayed in the case where a recording medium B is not formatted when timer dubbing is set in the recording and reproducing device of the present invention (First Embodiment).
Figure 10B:
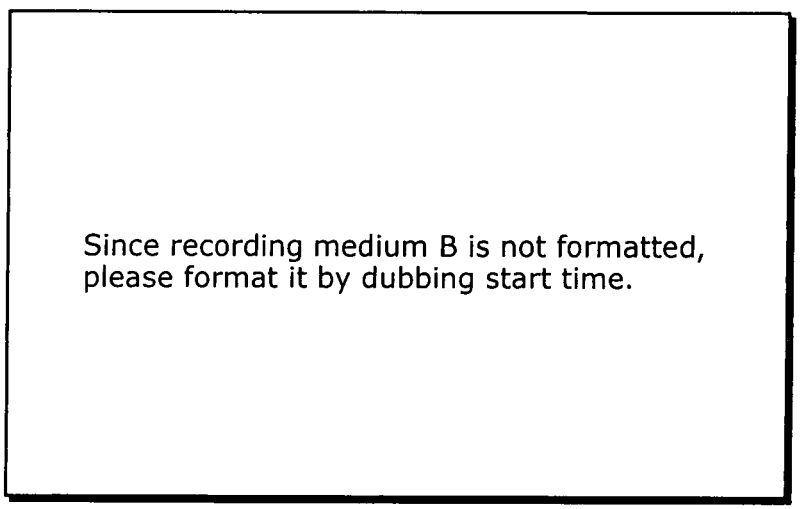

The control unit 110 checks whether or not a recording medium as a dubbing destination (the recording medium B 106) is formatted in a manner suitable for content to be recorded thereon when timer dubbing is set. When the recording medium is not formatted in such a manner, the control unit 110 may perform the processing of notifying the user of such situation to cancel the timer dubbing, or notifying the user of such situation and displaying a message for prompting the user to format the recording medium. FIGS. 10A and 10B are diagrams which show examples of screens displayed in the case where the recording medium B is not formatted when timer dubbing is set in the recording and reproducing device of the present invention. Here, the control unit 110 may prompt the user to format the recording medium immediately or to format it by the start time for timer dubbing.

Figure 12A:
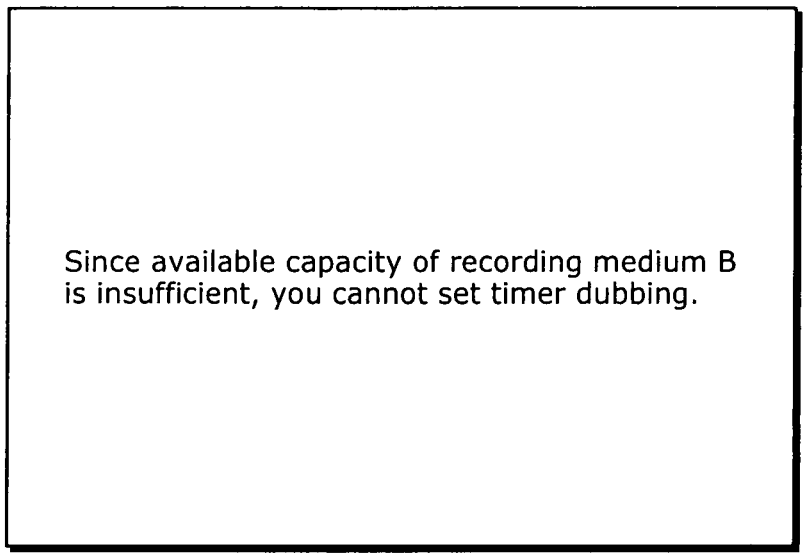
FIG. 12 is a schematic diagram for explaining the details of processing for setting timer dubbing in the recording and reproducing device of the present invention (First Embodiment).
Figure 12B:
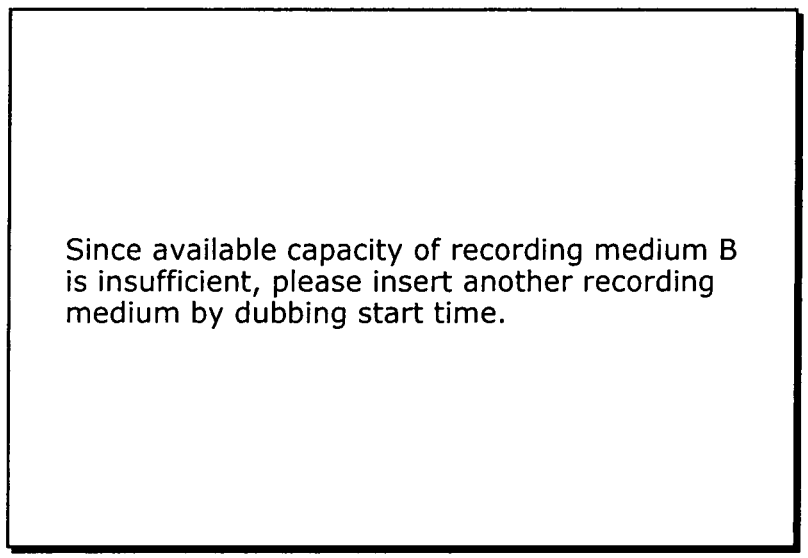

FIG. 11 is a diagram which shows one example of a screen displayed for prompting a user to partially or completely delete the content recorded on the recording medium B at the time of setting timer dubbing in the recording and reproducing device of the present invention. FIGS. 12A and 12B are diagrams which show examples of messages displayed when an amount of available capacity of the recording medium B 106 is less than the capacity required for dubbing. The control unit 110 checks the remaining amount of capacity of a recording medium as a dubbing destination when timer dubbing is set (S212). When the remaining amount of capacity of the recording medium as a dubbing destination is less than the capacity required for dubbing, the control unit 110 may perform the processing of notifying the user of such situation to cancel the timer dubbing (FIG. 12A), notifying the user of such situation and displaying a message for prompting the user to insert the recording medium (FIG. 12B), or displaying the content recorded on the recording medium as a dubbing destination to display a message for prompting the user to partially or completely delete the content recorded thereon.

The schedule management unit 112 manages the schedule of timer dubbing, obtains the time from the timer unit 113, and starts dubbing processing at that time. Since dubbing is performed in the same manner as mentioned above, the description thereof is not repeated here.

Figure 13A:
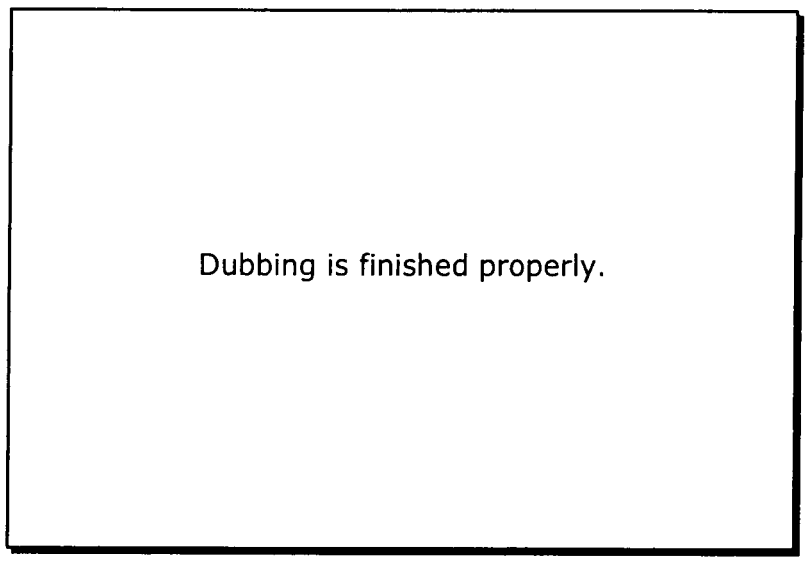
FIG. 13 is a schematic diagram for explaining the details of processing for setting timer dubbing in the recording and reproducing device of the present invention (First Embodiment).
Figure 13B:
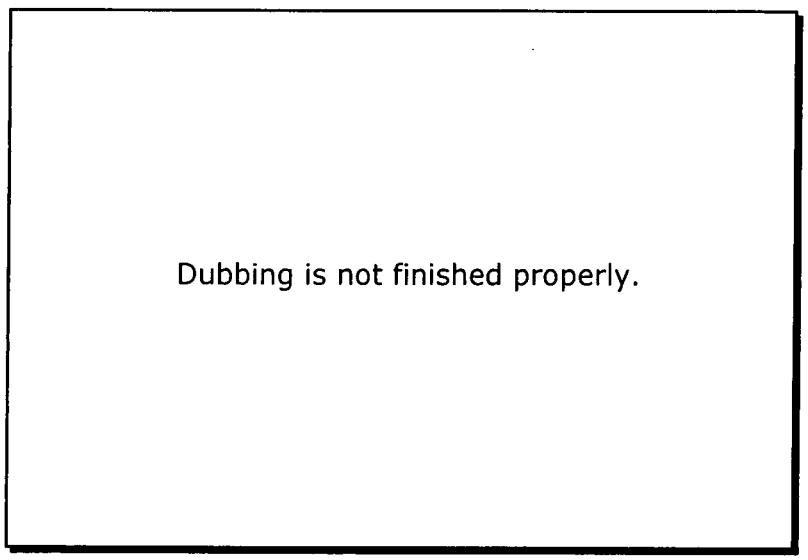

FIGS. 13A and 13B are diagrams which show examples of messages displaying whether or not dubbing is normally finished. When dubbing is finished properly, the control unit 110 controls the image generation unit 108 so as to cause it to generate a message indicating the fact, and the generated message is outputted via the display processing unit 107 (FIG. 13A). When dubbing is not finished properly for some reasons, the control unit 110 controls the image generation unit 108 so as to cause it to generate a message indicating the fact, and the generated message is outputted via the display processing unit 107 (FIG. 13B). The reasons that dubbing cannot be finished properly include: content as a dubbing source has been deleted when dubbing starts; a recording medium as a dubbing destination is not inserted when dubbing starts; an amount of available capacity of a recording medium as a dubbing destination is insufficient; a recording error occurs during dubbing and cannot be recovered; and the like. In the above embodiment, when a recording medium as a dubbing destination is not inserted, or when the available capacity of a recording medium as a dubbing destination is insufficient, a screen notifying a user of such situation is displayed. In addition, when an instruction is entered to delete, from a recording medium as a dubbing source, audio/video content which has been set to be dubbed, the schedule management unit 112 may confirm the setting of the dubbing by referring to an internally stored list of content which is set to be dubbed, and then display a warning such as "This content cannot be deleted because it is currently set to be dubbed", or the like.

In the above embodiment, a user enters a dubbing start time as a "preset time" as shown in, for example, FIGS. 3B and 3C. It should be noted, however, that the present invention is not limited to this time, and a user may, for example, specify a dubbing end time. In this case, when timer recording of a program is set immediately before the dubbing end time entered by the user, the control unit 110 starts dubbing after the program recording is finished and judges whether or not the dubbing can be finished by the dubbing end time specified by the user. Here, when the control unit 110 judges that the dubbing cannot be finished by the dubbing end time specified by the user, the control unit 110 may display a message, for example, "Dubbing onto a currently inserted recording medium of m-times speed will be finished at XX:XX:XX. Dubbing onto a recording medium of n-times speed will be finished at XX:XX:XX". As an alternative, the control unit 110 may search the schedule management unit 112 for an available time period longer than the amount of time required for dubbing audio/video content during a period between the current time and the preset end time of the dubbing, and if there is, set the timer dubbing during the available time period.

By allowing a user to specify a dubbing end time, as mentioned above, (1) the user can take out and carry, anytime he/she wants, the removable recording medium B 106 on which the audio/video content is dubbed. Or, (2) in the case where there is no capacity for recording a new program onto the recording medium A 104 (a HD or the like) because the available capacity of the recording medium A 104 is insufficient, it is generally conceived to transfer the content from the recording medium A 104 to the recording medium B 106 (an optical disk such as a DVD, BD or the like and a semiconductor memory such as an SD) to spare the available capacity in the recording medium A 104. In this case, if the user knows, in advance, the preset time for recording a program, there is an effect that the user can record the program without fail by specifying the preset time as the dubbing end time.

The above embodiment describes the case where two recording media, the recording medium A 104 and the recording medium B 106 are included. It should be noted, however, that three or more recording media may be included.

The embodiment of the present invention is not limited to the embodiment as hardware, and it can also perform recording and reproduction processing as a program on a computer.

Furthermore, the present invention is not limited to the above embodiment, and many variations or modifications are possible without departing from the scope of the present invention.

Note that each functional block of the block diagram (FIG. 1), except the recording medium A 104, the recording medium B 106 and the operation unit 111, is typically achieved in the form of an integrated circuit or an LSI. Each of these blocks can be in plural single-function LSIs, or also can be in one integrated LSI including a part or all of these functions.

(For example, the functional blocks other than a memory may be integrated into one chip). The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows reconfiguration of the connection or setup of circuit cells inside the LSI can be used for the same purpose.

In the future, with advancement in semiconductor technology or another technology derived therefrom, a brand-new integration technology may replace LSI. The integration can be carried out by that technology. Application of biotechnology is one such possibility.

In addition, only a unit for storing data to be coded or decoded, among these functional blocks, may be treated as a separate function without being integrated into one chip.

The recording and reproducing device of the present invention is useful as a recording and reproducing device which dubs content recorded on the first recording medium onto the second recording medium.

The invention claimed is:

1. A recording and reproducing device that records and reproduces audio/video content, the recording and reproducing device comprising:
    a non-transitory computer-readable storage device storing a program that is executable by a processor;
    a first recording and reproducing processing unit configured to record audio/video content on and reproduce audio/video content from a first recording medium;
    a second recording and reproducing processing unit configured to record audio/video content on and reproduce audio/video content from a second recording medium;
    an operation accepting unit configured to accept an instruction regarding either recording or reproducing of audio/video content from a user;
    a control unit configured to calculate an amount of time required for dubbing in accordance with the second recording medium when receiving from the operation accepting unit a dubbing instruction to execute, at a preset time, dubbing of audio/video content from the first recording medium onto the second recording medium using the first recording and reproducing processing unit and the second recording and reproducing processing unit; and
    a schedule storage unit configured to store a schedule regarding recording or reproducing by the first recording and reproducing processing unit or the second recording and reproducing processing unit, the schedule being inputted in advance from the operation accepting unit,
    wherein the control unit is configured to calculate the amount of time required for dubbing based on a volume of the audio/video content and a recording speed of the second recording medium, and
    when receiving the dubbing instruction to execute the dubbing of the audio/video content from the first recording medium onto the second recording medium, the control unit is configured to search the schedule stored in the schedule storage unit for an available time period in which both the first recording and reproducing processing unit and the second recording and reproducing processing unit are available at the same time, and to determine to execute the dubbing during the available time period, and
    wherein when receiving the dubbing instruction to execute the dubbing of the audio/video content from the first recording medium onto the second recording medium, the control unit automatically searches the schedule stored in the schedule storage unit for the available time period.

2. The recording and reproducing device according to claim 1, further comprising:
    an image generation unit configured to generate a message screen under control of the control unit,
    wherein the control unit is configured to judge, based on the received dubbing instruction to execute the dubbing at the preset time and the calculated amount of time required for the dubbing, whether or not an execution duration of the dubbing partially or completely overlaps with an execution duration in the schedule stored in the schedule storage unit, and when judging that the execution durations overlap one another, to perform at least one of (1) control of the image generation unit so that the image generation unit generates a message screen indicating that the execution durations overlap, and (2) adjustment between the overlapped execution durations of the stored schedule and the dubbing.

3. The recording and reproducing device according to claim 2,
    wherein when judging that the execution durations overlap one another, the control unit is configured to reject the dubbing instruction, and to control the image generation unit so that the image generation unit generates a message screen prompting to set another time for the dubbing.

4. The recording and reproducing device according to claim 2,
    wherein when receiving the dubbing instruction, the control unit is configured to check whether or not the second recording medium as a dubbing destination is present, and when judging that the second recording medium is not present, to control the image generation unit so that the image generation unit generates a message screen prompting to insert the second recording medium.

5. The recording and reproducing device according to claim 2,
    wherein when receiving the dubbing instruction, the control unit is configured to check whether or not the second recording medium as a dubbing destination is formatted in a manner suitable for recording the audio/video content, and when judging that the second recording medium is not formatted in the manner suitable for recording the audio/video content, to control the image generation unit so that the image generation unit generates a message screen prompting to format the second recording medium in the manner suitable for recording the audio/video content.

6. The recording and reproducing device according to claim 2,
    wherein when receiving the dubbing instruction, the control unit is configured to check an amount of available capacity of the second recording medium as a dubbing destination, and when the amount of available capacity of the second recording medium is less than an amount of capacity required for executing the dubbing instruction, to control the image generation unit so that the image generation unit generates a message screen prompting to insert another recording medium as the second recording medium.

7. The recording and reproducing device according to claim 2,
    wherein when judging that the execution durations do not overlap, the control unit is configured to cause the schedule storage unit to store the dubbing instruction as a new schedule, and when receiving, from the operation accepting unit, an instruction to delete the audio/video content to be dubbed according to the dubbing instruction in the schedule stored in the schedule storage unit, to control the image generation unit so that the image generation unit generates a message screen indicating that the audio/video content instructed to be deleted is to be dubbed according to the dubbing instruction.

8. The recording and reproducing device according to claim 1, further comprising:
   a data format changing unit configured to change a data format of audio/video content into a format suitable for recording onto the first recording medium or the second recording medium,
   wherein the control unit is configured to calculate the amount of time required for further dubbing based on an amount of time required for changing the data format of the audio/video content.

9. The recording and reproducing device according to claim 1, further comprising:
   an external data receiving unit configured to receive audio/video content from outside as broadcast data, communication data or data from an external device,
   wherein the first recording and reproducing processing unit is configured to record the received audio/video content onto the first recording medium.

10. The recording and reproducing device according to claim 2,
    wherein when receiving the dubbing instruction, the control unit is configured to check an amount of available capacity of the second recording medium as a dubbing destination, and when the amount of available capacity of the second recording medium is less than an amount of capacity required for executing the dubbing instruction, to control the image generation unit so that the image generation unit displays a list of audio/video content already recorded on the second recording medium and generates a message screen prompting to partially or completely delete the audio/video content in the list.

11. The recording and reproducing device according to claim 1, further comprising:
    an image generation unit configured to generate a message screen under control of the control unit,
    wherein when receiving from the operation accepting unit an end time of the dubbing as the preset time in the dubbing instruction, the control unit is configured to calculate the amount of time required for the dubbing, judge, based on the received end time of the dubbing and the calculated amount of time required for the dubbing, whether or not an execution duration of the dubbing partially or completely overlaps with an execution duration in the schedule stored in the schedule storage unit, and when judging that the execution durations overlap one another the control is configured to perform at least one of (1) control of the image generation unit so that the image generation unit generates a message screen indicating that the execution durations overlap, and (2) adjustment between the overlapped execution durations of the stored schedule and the dubbing.

12. A recording and reproducing method for recording and reproducing audio/video content, the recording and reproducing method comprising:
    a first recording and reproducing step of recording audio/video content on and reproducing audio/video content from a first recording medium, using a first recording and reproducing processing unit;
    a second recording and reproducing step of recording audio/video content on and reproducing audio/video content from a second recording medium, using a second recording and reproducing processing unit;
    an operation accepting step of accepting, using an operation accepting unit, an instruction regarding either recording or reproducing of audio/video content from a user;
    a control step of, in the first recording and reproducing step and the second recording and reproducing step, calculating using a control unit an amount of time required for dubbing in accordance with the second recording medium when a dubbing instruction to execute, at a preset time, dubbing of audio/video content from the first recording medium onto the second recording medium is inputted in the operation accepting step; and
    a schedule storing step of storing a schedule regarding recording or reproducing in the first recording and reproducing step or the second recording and reproducing step, the schedule being inputted in advance in the operation accepting step,
    wherein, in the control step, the amount of time required for dubbing is calculated based on a volume of the audio/video content and a recording speed of the second recording medium, and
    when receiving the dubbing instruction to execute the dubbing of the audio/video content from the first recording medium onto the second recording medium, an available time period in which both the first recording and reproducing processing unit and the second recording and reproducing processing unit are available at the same time stored in the schedule storing step is searched for, and it is determined to execute the dubbing during the available time period, and
    wherein when receiving the dubbing instruction to execute the dubbing of the audio/video content from the first recording medium onto the second recording medium, the control step automatically searches the schedule stored in the schedule storage unit for the available time period.

13. A non-transitory computer-readable recording medium storing a program used for a recording and reproducing device that records and reproduces audio/video content, the program causing a computer to execute:
    a first recording and reproducing step of recording audio/video content on and reproducing audio/video content from a first recording medium;
    a second recording and reproducing step of recording audio/video content on and reproducing audio/video content from a second recording medium;
    an operation accepting step of accepting an instruction regarding either recording or reproducing of audio/video content from a user;
    a control step of, in the first recording and reproducing step and the second recording and reproducing step, calculating an amount of time required for dubbing in accordance with the second recording when a dubbing instruction to execute, at a preset time, dubbing of audio/video content from the first recording medium onto the second recording medium is inputted in the operation accepting step; and
    a schedule storing step of storing a schedule regarding recording or reproducing in the first recording and reproducing step or the second recording and reproducing step, the schedule being inputted in advance in the operation accepting step, wherein, in the control step, the amount of time required for dubbing is calculated based on a volume of the audio/video content and a recording speed of the second recording medium, and when receiving the dubbing instruction to execute the dubbing of the audio/video content from the first recording medium onto the second recording medium, an available time period in which both the first recording and reproducing processing unit and the second recording and reproducing processing unit are available at the same time stored in the schedule storage step is searched for, and it is determined to execute the dubbing during the available time period, and wherein when receiving the dubbing instruction to execute the dubbing of the audio/video content from the first recording medium onto the second recording medium, the control step automatically searches the schedule stored in the schedule storage unit for the available time period.

14. An integrated circuit that implements a recording and reproducing device which records and reproduces audio/video content, the integrated circuit comprising:

a non-transitory computer-readable storage device storing a program that is executable by a processor;

a first recording and reproducing processing unit configured to record audio/video content on and reproduce audio/video content from a first recording medium;

a second recording and reproducing processing unit configured to record audio/video content on and reproduce audio/video content from a second recording medium;

an input terminal to which a signal indicating an instruction regarding either recording or reproducing of audio/video content is inputted from a user;

a control unit configured to calculate an amount of time required for dubbing in accordance with the second recording medium when receiving from the input terminal a signal indicating a dubbing instruction to execute, at a preset time, dubbing of audio/video content from the first recording medium onto the second recording medium using the first recording and reproducing processing unit and the second recording and reproducing processing unit; and a schedule storage unit configured to store a schedule regarding recording or reproducing by the first recording and reproducing processing unit or the second recording and reproducing processing unit, the schedule being inputted in advance from the input terminal, wherein the control unit is configured to calculate the amount of time required for dubbing based on a volume of the audio/video content and a recording speed of the second recording medium, and when receiving the dubbing instruction to execute the dubbing of the audio/video content from the first recording medium onto the second recording medium, the control unit is configured to search the schedule stored in the schedule storage unit for an available time period in which both the first recording and reproducing processing unit and the second recording and reproducing processing unit are available at the same time, and to determine to execute the dubbing during the available time period, and wherein when receiving the dubbing instruction to execute the dubbing of the audio/video content from the first recording medium onto the second recording medium, the control unit automatically searches the schedule stored in the schedule storage unit for the available time period.

15. A recording and reproducing system that records and reproduces audio/video content, the recording and reproducing system comprising:

a recording and reproducing device comprising:

a non-transitory computer-readable storage device storing a program that is executable by a processor;

a first recording and reproducing processing unit configured to record audio/video content on and reproduce audio/video content from a first recording medium;

a second recording and reproducing processing unit configured to record audio/video content on and reproduce audio/video content from a second recording medium;

an operation accepting unit configured to accept an instruction regarding either recording or reproducing of audio/video content from a user;

a control unit configured to calculate an amount of time required for dubbing in accordance with the second recording medium when receiving from the operation accepting unit a dubbing instruction to execute, at a preset time, dubbing of audio/video content from the first recording medium onto the second recording medium using the first recording and reproducing processing unit and the second recording and reproducing processing unit; and a schedule storage unit configured to store a schedule regarding recording or reproducing by the first recording and reproducing processing unit or the second recording and reproducing processing unit, the schedule being inputted in advance from the operation accepting unit, wherein the control unit is configured to calculate the amount of time required for dubbing based on a volume of the audio/video content and a recording speed of the second recording medium, and when receiving the dubbing instruction to execute the dubbing of the audio/video content from the first recording medium onto the second recording medium, the control unit is configured to search the schedule stored in the schedule storage unit for an available time period in which both the first recording and reproducing processing unit and the second recording and reproducing processing unit are available at the same time, and to determine to execute the dubbing during the available time period, and wherein when receiving the dubbing instruction to execute the dubbing of the audio/video content from the first recording medium onto the second recording medium, the control unit automatically searches the schedule stored in the schedule storage unit for the available time period; and a remote control device that accepts, from a user, an instruction to the recording and reproducing device regarding either recording or reproducing of audio/video content, the remote control device comprising:

a non-transitory computer-readable storage device storing a program that is executable by a processor;

an operation unit which is one of a button on a device, a keyboard, and a personal computer linked by a cable, a network or wireless connection, and which is configured to accept, from the user, a dubbing instruction to the recording and reproducing device to execute dubbing at a preset time;

a communication unit configured to send the accepted dubbing instruction to the recording and reproducing device, and to receive a response to the dubbing instruction from the recording and reproducing device, the response including an amount of time required for dubbing calculated by the recording and reproducing device based on a volume of the audio/video content and a recording speed of a recording medium; and a display unit configured to display the response received from the recording and reproducing device.

16. A non-transitory computer-readable recording medium storing a program used for a recording and reproducing system that records and reproduces audio/video content, the program causing a computer to execute:

a first recording and reproducing step of recording audio/video content on and reproducing audio/video content from a first recording medium;

a second recording and reproducing step of recording audio/video content on and reproducing audio/video content from a second recording medium;

an operation accepting step of accepting an instruction regarding either recording or reproducing of audio/video content from a user;

a control step of, in the first recording and reproducing step and the second recording and reproducing step, calculating an amount of time required for dubbing in accordance with the second recording when a dubbing instruction to execute, at a preset time, dubbing of audio/video content from the first recording medium onto the second recording medium is inputted in the operation accepting step;

a schedule storing step of storing a schedule regarding recording or reproducing in the first recording and reproducing step or the second recording and reproducing step, the schedule being inputted in advance in the operation accepting step, wherein, in the control step, the amount of time required for dubbing is calculated based on a volume of the audio/video content and a recording speed of the second recording medium, and when receiving the dubbing instruction to execute the dubbing of the audio/video content from the first recording medium onto the second recording medium, an available time period in which both the first recording and reproducing processing unit and the second recording and reproducing processing unit are available at the same time stored in the schedule storage step is searched for, and it is determined to execute the dubbing during the available time period, and wherein when receiving the dubbing instruction to execute the dubbing of the audio/video content from the first recording medium onto the second recording medium, the control step automatically searches the schedule stored in the schedule storage unit for the available time period;

a communication step of sending the accepted dubbing instruction to the recording and reproducing device, and receiving a response to the dubbing instruction from the recording and reproducing device, the response including an amount of time required for dubbing calculated by the recording and reproducing device based on a volume of the audio/video content and a recording speed of a recording medium; and a display step of displaying the response received from the recording and reproducing device.

* * * * *